US006308220B1

(12) United States Patent
Mathur (10) Patent No.: US 6,308,220 B1
(45) Date of Patent: Oct. 23, 2001

(54) CIRCULATING PARALLEL-SEARCH ENGINE WITH RANDOM INPUTS FOR NETWORK ROUTING TABLE STORED IN A WIDE EMBEDDED DRAM

(75) Inventor: Harish N. Mathur, San Jose, CA (US)

(73) Assignee: NeoMagic Corp., Santa Clara, CA (US)

(*) Notice: Subject to any disclaimer, the term of this patent is extended or adjusted under 35 U.S.C. 154(b) by 0 days.

(21) Appl. No.: 09/240,726

(22) Filed: Jan. 29, 1999

(51) Int. Cl.[7] .................. G06F 13/00; G06F 15/173; H01L 12/28
(52) U.S. Cl. ............................. 709/238; 370/351
(58) Field of Search ................ 709/238; 370/351; 707/6

(56) References Cited

U.S. PATENT DOCUMENTS

| 4,608,684 | 8/1986 | Upp ........................ 370/368 |
| 4,818,987 | 4/1989 | Ide et al. ................. 340/7.46 |
| 5,187,745 | 2/1993 | Yip et al. ................. 704/219 |
| 5,386,413 | 1/1995 | McAuley et al. ......... 370/392 |
| 5,502,832 | 3/1996 | Ali-Yahia et al. ........ 711/108 |
| 5,509,006 | 4/1996 | Wilford et al. ........... 370/401 |
| 5,684,954 | 11/1997 | Kaiserswerth et al. .... 709/236 |
| 5,694,406 | 12/1997 | Lipovski ................... 365/805 |
| 5,710,915 | 1/1998 | McElhiney ................ 707/3 |
| 5,758,148 | 5/1998 | Lipovski ................... 707/6 |
| 5,768,258 * | 6/1998 | Van As et al. ........... 370/236 |
| 5,781,431 | 7/1998 | Duret et al. .............. 714/811 |
| 6,032,190 * | 2/2000 | Bremer et al. ........... 709/238 |
| 6,161,144 * | 12/2000 | Michels et al. .......... 709/238 |

OTHER PUBLICATIONS

ACD80800 Address Resolution Logic Data Sheet. Advanced Communication Devices, 7/98.
"A Day in the Life of an LS Packet" Application note, I–Cube, 10/97, pp. 1–19.

* cited by examiner

Primary Examiner—Kenneth R. Coulter
(74) Attorney, Agent, or Firm—Stuart T. Auvinen (57) ABSTRACT

A search engine for a network switch reads a routing table for an entry with a matching MAC or IP address. The routing table is contained in an embedded DRAM. The search engine and the embedded-DRAM routing table are integrated together on the same integrated circuit chip, allowing a very wide data path between the search engine and the routing table. A free-running sequencer outputs addresses to the routing table so that each entry is read in a continuous-loop sequence. The same entry is sent to comparators for all active searches. Destination addresses for different input ports are compared to the entry read from the table. A match ends the search for a port while searches for other ports continue. Since ports can begin and end searches at any point in the continuous-loop sequence, a same low latency is provided for all input ports, even when other searches are in progress. The wide data path from the embedded-DRAM allows several entries to be read and compared for each cycle and for each port. Thus multiple entries are compared in parallel for each port, and ports are searched in parallel.

20 Claims, 10 Drawing Sheets

PRIOR ART

| TIME | DRAM ENTRY READ | ENTRY COMPARED | | | |
|---|---|---|---|---|---|
| | | PORT A | PORT B | PORT C | PORT D |
| 1 | 1 | 1 | | | |
| 2 | 2 | 2 | | | |
| 3 | 3 | 3 | | 3 | |
| 4 | 4 | 4 | 4 | 4 | |
| 5 | 5 | 5 | 5 | 5 | 5 |
| 6 | 6 | 6 | 6 | 6 | 6 |
| 7 | 7 | 7 | 7 | 7 | 7 |
| 8 | 1 | | 1 | 1 | 1 |
| 9 | 2 | | 2 | 2 | 2 |
| 10 | 3 | | 3 | | |
| 11 | 4 | | | | |

FIG. 7

| TIME | DRAM ENTRY READ | ENTRY COMPARED | | | |
|---|---|---|---|---|---|
| | | PORT A | PORT B | PORT C | PORT D |
| 1 | 1,2,3 | | 1,2,3 | | |
| 2 | 4,5,6 | 4,5,6 | 4,5,6 | | |
| 3 | 7,8,9 | 7,8,9 | 7,8,9 | | |
| 4 | 1,2,3 | 1,2,3 | | | |
| 5 | 4,5,6 | | | 4,5,6 | |
| 6 | 7,8,9 | | | 7,8,9 | 7,8,9 |
| 7 | 1,2,3 | | | 1,2,3 | 1,2,3 |
| 8 | 4,5,6 | | | | |
| 9 | 7,8,9 | | | | |

CIRCULATING PARALLEL-SEARCH ENGINE WITH RANDOM INPUTS FOR NETWORK ROUTING TABLE STORED IN A WIDE EMBEDDED DRAM

FIELD OF THE INVENTION

This invention relates to computer networks, and more particularly to searching a routing table to configure a network switch.

BACKGROUND OF THE INVENTION

Computer networks such as local-area networks (LANs) and larger wide-area networks (WANs) route data packets from one station to another often through intermediate nodes. Recently network switches making switching decisions based on multiple OSI Layers have become favored for connecting different stations on a LAN or different LANs on a corporate backbone network. These network switches have a higher throughput than earlier hubs or repeaters since multiple connections may be dynamically made and broken between different pairs of network nodes as needed, and they significantly reduce network congestion experienced in the shared media.

Figure 1:
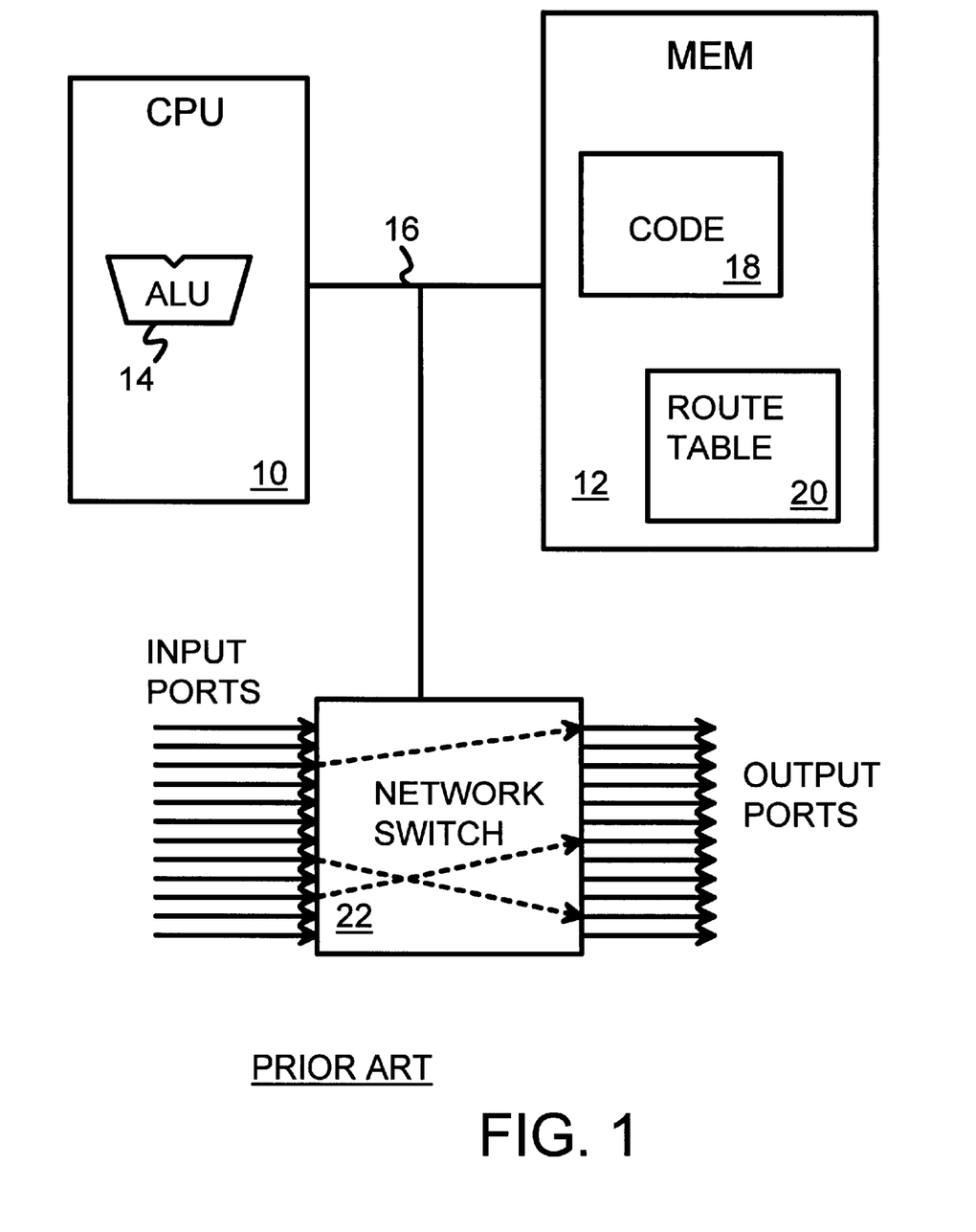
FIG. 1 is a diagram of a prior-art system that configures a network switch based on a search of a routing table using a microprocessor.

FIG. 1 is a diagram of a prior-art system that configures a network switch based on a search of a routing table using a microprocessor. Routing table 20 contains entries for different network addresses. These entries may be for lower-level media-access-controller (MAC) addresses on a LAN or higher-level Internet-Protocol (IP) addresses for a WAN. Each entry contains a MAC or IP address and a port number. Incoming packets to network switch 22 contain a destination address, such as a MAC and/or IP address. For some switches capable of performing multi-layered switching, the IP address may only be searched if the MAC address matches. The traditional routers are networked devices, and they only do IP-address searches. This destination address from the incoming packet is compared to the addresses in the entries in routing table 20 until a match is found. Then the port number for the matching entry is used to configure network switch 22, so that the data from the incoming port is forwarded to the output port identified by the port number from the matching entry in routing table 22.

Central processing unit (CPU) 10 monitors the input ports of network switch 22 for incoming packets. When an incoming packet is detected, CPU 10 reads the destination address of the new packet. Then CPU 10 executes a search routine to look for a matching entry in routing table 20. Once a matching entry is found, CPU 10 sends instructions to network switch 22 over bus 16 to establish a connection between the input port receiving the new input packet and the output port identified by the port number from the matching entry in routing table 20.

When CPU 10 is a general-purpose processor, CPU instructions are read from memory 12 over bus 16 before CPU 10 executes each instruction. The search routine is a series of such instructions contained in code block 18 in memory 12. For each entry in routing table 20, several instructions are fetched from code block 18, and the entry itself is read from routing table 20 in memory 12. Thus several accesses of memory 12 over bus 16 are required. Caching of instructions in CPU 10 can reduced traffic on bus 16, but usually caches are not large enough to contain routing table 20.

For each entry in routing table 20, the entry must be read from routine table 20 and compared to the destination address, which is stored in a register in CPU 10. Within CPU 10, arithmetic-logic-unit (ALU) 14 compares the destination address to the address in the entry read from routing table 20. This compare is repeated for each entry read from routing table 20 until a match is found.

Thus many accesses of memory 12 by CPU 10 are required to search routing table 20. Other incoming packets for other input ports may be detected before the search is complete. The search for these other incoming packets may need to be delayed until the first search is completed. Thus the delay or latency for these subsequent packets is increased. System throughput may be decreased, or a faster, more expensive CPU is needed to reduce delay and latency. However, the search must still be performed serially resulting in ports waiting in long queues while waiting for the CPU to finish the on-going search.

Some hardware-assisted search chips (integrated circuits) are being developed. For example, a dedicated search engine may be used rather than ALU 14 in CPU 10. This dedicated search engine can be directly coupled to the memory containing routing table 20. While this hardware improves the efficiency of the search engine compared to using the CPU, it does not solve the problem of serial search. Furthermore, the speed of the search is limited by the bandwidth (number of pins allocated to the table memory).

Embedded-DRAM Graphics Display Systems

The assignee has recognized the problem of bottlenecks to external dynamic-random-access memory (DRAM) in graphics display systems, and has pioneered embedded DRAM for graphics controllers. See for example: Puar et al., "Graphics Controller Integrated Circuit Without Memory Interface", U.S. Pat. Nos. 5,650,955 and 5,703,806. These embedded-DRAM graphics controllers have been used predominantly for portable PC's such as laptop and notebook PCs.

Although graphics controllers are in a different technical field hand network switches, the inventor has realized that such embedded DRAM technology could solve performance and cost problems for network switches. While many view embedded DRAM technology as useful only for portable systems, the inventor realizes that computer-network routers could benefit from the performance and cost improvement of embedded DRAM.

What is desired is a search engine for a network switch. It is desired to have a dedicated search engine search a network routing table for an entry with a matching MAC or IP address. It is further desired to use an embedded DRAM containing the routing table. It is desired to locate the search engine and the embedded DRAM on the same integrated circuit chip, allowing a very wide data path between the search engine and the routing table. It is further desired to increase the speed of the search engine by using an ultra-wide data path to the routing table. A parallel architecture for the search engine is also desired to allow searches for different input ports to occur at the same time, increasing throughput and decreasing latency. It is desired to provide a same low latency for all input ports even when other searches are in progress. A highly-parallel multiple-port search engine is desired.

SUMMARY OF THE INVENTION

A parallel-search integrated circuit has a free-running sequencer that repeatedly outputs a sequence of addresses in a loop. A table stores a plurality of entries. The table outputs an entry in response to an address from the free-running sequencer.

A plurality of search engines are included. Each search engine receives the entry from the table. A first search engine compares at least a portion of the entry to a first input and generates a first match signal when the first input matches the at least a portion of the entry. A second search engine compares the at least a portion of the entry to a second input and generates a second match signal when the second input matches the at least a portion of the entry. A third search engine compares the at least a portion of the entry to a third input and generates a third match signal when the third input matches the at least a portion of the entry.

The free-running sequencer repeats the sequence of addresses once all entries have been read from the table. The first search engine begins a search once the first input is received, beginning the search at any address in the sequence of addresses and continuing until all entries have been compared by the first search engine or until the first match signal is generated. The second search engine begins a search once the second input is received, beginning the search at any address in the sequence of addresses and continuing until all entries have been compared by the second search engine or until the second match signal is generated. Likewise, the third search engine begins a search once the third input is received, beginning the search at any address in the sequence of addresses and continuing until all entries have been compared by the third search engine or until the third match signal is generated.

The first, second, and third search engines perform overlapping searches that begin and end at different times and at different addresses in the sequence. Thus parallel searches are performed.

In further aspects of the invention, the table is contained in an embedded dynamic-random-access memory (DRAM) integrated on a same silicon chip as the free-running sequencer and plurality of search engines. Thus the table is in the embedded DRAM. An internal bus is coupled between the table and the plurality of search engines. The internal bus transfers the entry from the table to the plurality of search engines.

In still further aspects, the internal bus is a wide bus having a width sufficient to transfer a group of multiple entries to each search engine in the plurality of search engines for each memory access cycle of the embedded DRAM. The first search engine compares at least a portion of each of the multiple entries to the first input and generates a first match signal when the first input matches the at least a portion of any of the multiple entries. Likewise, the second search engine and the third search engines each compare at least a portion of each of the multiple entries to the second or third input and generates a second or third match signal when the second or third input matches the at least a portion of any of the multiple entries. Thus multiple entries are compared for each memory access cycle from the embedded DRAM.

In still further aspects the table is a network routing table. Each entry contains a network address that is compared by the first search engine to a first destination address applied to the first input. It is also compared by the second search engine to a second destination address applied to the second input, and it is compared by the third search engine to a third destination address applied to the third input. Thus the network routing table is searched for an entry that matches a destination address.

DETAILED DESCRIPTION

The present invention relates to an improvement in network route-table searching. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventor has realized that embedded DRAM technology could solve performance and cost problems for a search of a network routing table. While many view embedded DRAM technology as useful only for portable-computer graphics-display systems, the inventor realizes that a routing table search engine could benefit from the performance and cost improvement of embedded DRAM.

The inventor also realizes that unusually wide data paths are feasible with embedded DRAM. These wider data paths allow more table entries to be retrieved in a cycle, increasing bandwidth. Different, highly-parallel architectures are then possible for the search engine.

Figure 2:
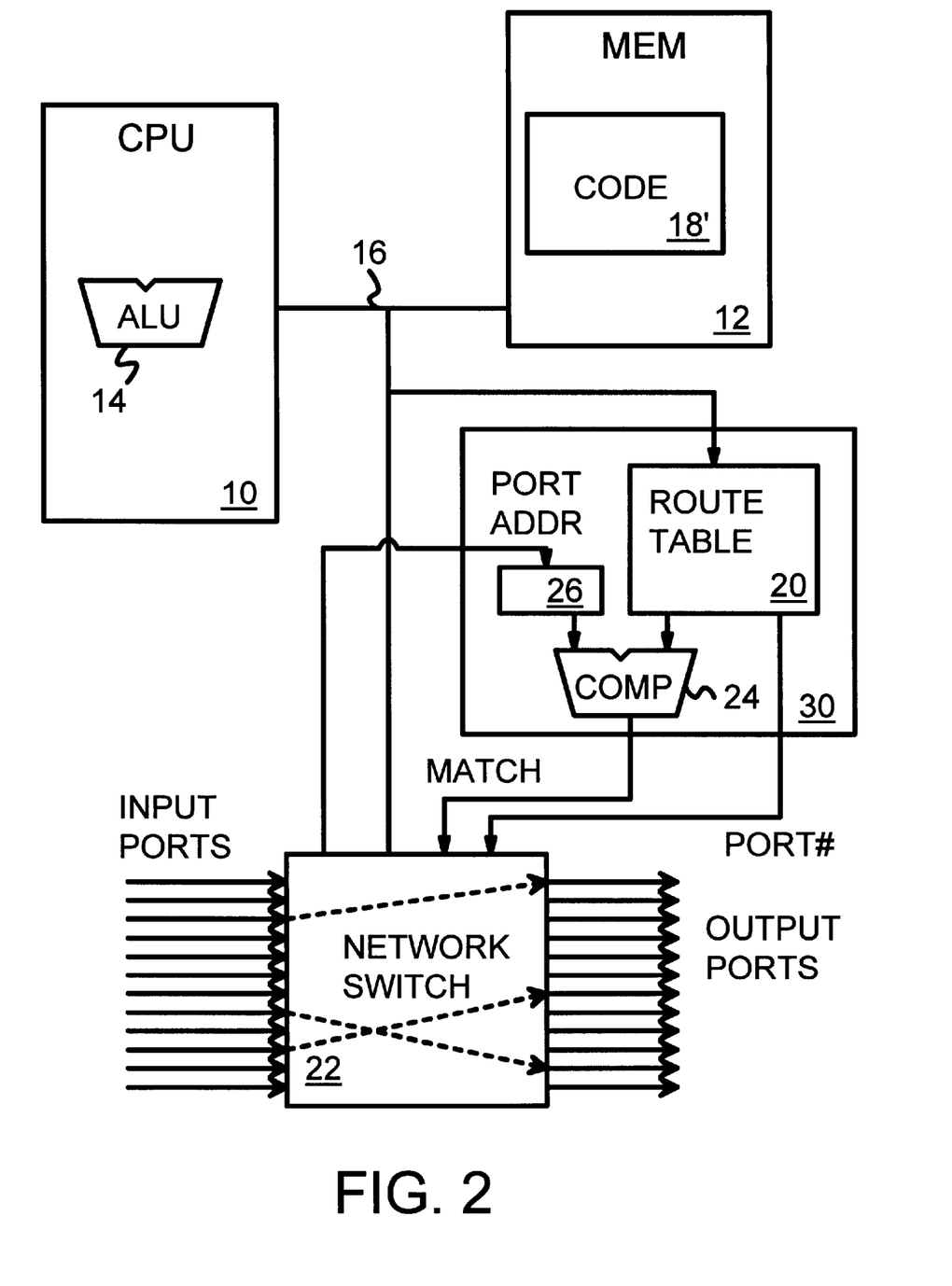
FIG. 2 is a diagram of a network-switch router that uses a search engine with an embedded-DRAM routing table.

FIG. 2 is a diagram of a network-switch that uses a search engine with an embedded-DRAM routing table. Search chip 30 is an integrated circuit (IC) that contains an embedded dynamic-random-access memory (DRAM). Routing table 20 is contained in the embedded DRAM. Using DRAM rather than faster external static RAM (SRAM) allows for a much larger memory size, allowing for more entries in routing table 20.

Since each output port may connect to other routers, hubs, repeaters, or network connections, each output port may require many entries since many addresses are routed through the output port. As many as 8K or more entries in routing table 20 are required for a network switch. For 64-bit entries, a memory size of 512 Kbits is needed for the 8K entries when the bus width is 1024 bits.

When a new incoming packet to an input port of network switch 22 is detected, the packet's destination address captured by the media-access-controller (MAC) is loaded into port register 26 on search chip 30. Entries from routing table 20 are read and sent to comparator 24, which compares the MAC address from port register 26 to the MAC address in the selected entry from routing table 20. When no match is detected by comparator 24, the next entry in routing table 20 is read and compared.

Once a matching MAC address is detected by comparator 24, the port number from that match entry is sent to network switch 22 along with a match signal. The match signal causes network switch 22 to make a connection from the input port to the output port identified by the port number from the matching entry. The incoming packet is then forwarded across the connection to the output port toward its final destination. Once the packets are transmitted, the connection in the switching fabric of network switch 22 can be broken.

CPU 10 may still be used for oversight functions, executing code 18' from memory 12. However, code 18' does not search the routing table but merely performs higher-level functions such as initializing network switch 22, performing error recovery, and accumulating network statistics. ALU 14 in CPU 10 is not used for the compare function when routing table 20 is searched. Thus the many instructions for searching each entry in routing table 20 are not executed by CPU 10 and are not fetched from memory 12. Entries from routing table 20 are not sent over bus 16. Bandwidth requirement on bus 16 is greatly reduced, allowing a slower CPU 10 to be used. CPU 10 and memory 12 may even be eliminated in some systems.

Since routing table 20 and comparator 24 are integrated onto the same search chip 30, external pins are not needed for transferring the entries. A very wide internal bus from routing table 20 to comparator 24 may be used. For example, a 256-bit internal bus can transfer 4 entries in a single access cycle. This would require a 300-pin chip if an embedded DRAM was not used.

In another example, a 1024-bit internal bus allows 16 entries of routing table 20 to be sent to comparator 24 for each memory access cycle. Such a transfer rate would require perhaps a 1200-pin chip, or multiple chips, making the cost prohibitive. Thus putting routing table 20 in an embedded DRAM allows 4 to 16 or more entries to be searched in parallel by search chip 30 thus reducing the latency by the same factor.

Figure 3:
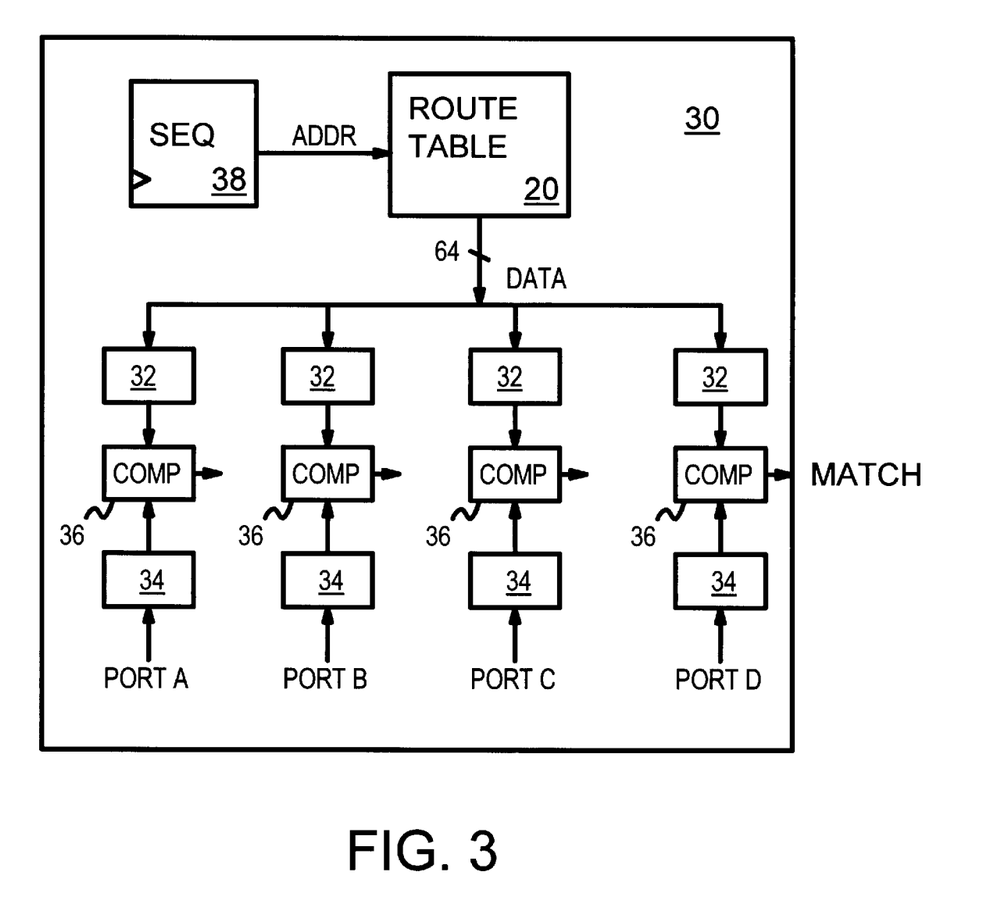
FIG. 3 shows a search chip with an embedded-DRAM routing table that searches up to four input ports in parallel.

Parallel-Port Search Chip—FIG. 3

FIG. 3 shows a search chip with an embedded-DRAM routing table that searches up to four input ports in parallel. Sequencer 38 generates a sequence of 8K addresses, and can be implemented as a 13-bit binary or gray-code counter. When the number of entries in routing table 20 is less than 8K, a smaller counter can be used, or the terminal count can be programmed and the counter reset at the terminal count. Each address in the sequence is for a different entry in routing table 20. Sequencer 38 is driven by a free-running clock, although the clock may be stopped or disabled for power-savings or test modes when no incoming packets are received.

Routing table 20 outputs a different entry for each address received from sequencer 38. This entry is latched into all four entry registers 32. When an incoming packet is detected, its destination address is latched into one of port registers 34. As other incoming packets are detected on other ports, their destination addresses are also loaded into other port registers 34. Up to four different destination addresses for four different input ports can be stored in port registers 34. This allows up to four searches for different input ports to be performed simultaneously.

Comparators 36 compare each of the four destination addresses in port registers 34 to the same entry address in each of the four entry registers 32. If any of comparators 36 detects a match, than the output-port number from the entry for that port is output to the network switch and a connection is made. The search for that port ends, but the searches for the other ports continue. Sequencer 38 causes search chip 30 to continuously circulate through all entries in routing table 20.

Each entry read from routing table 20 is thus compared to four destination addresses at the same time. As new packets are detected, new searches can begin immediately. The searches continue as the address from sequencer 38 wraps around from the last table entry to the first entry. A search ends once a matching entry is found. Since a search can begin at any point in the table, the length of time until a match is found is indeterminate. However, the maximum time is 8K cycles, the time to read all entries. There is no initial delay while a previous search completes.

Such a parallel-port search chip 30 uses just a 64-bit bus between routing table 20 and entry registers 32, since each entry is 64 bits. However, much wider internal busses are contemplated, greatly increasing search bandwidth.

Figure 4:
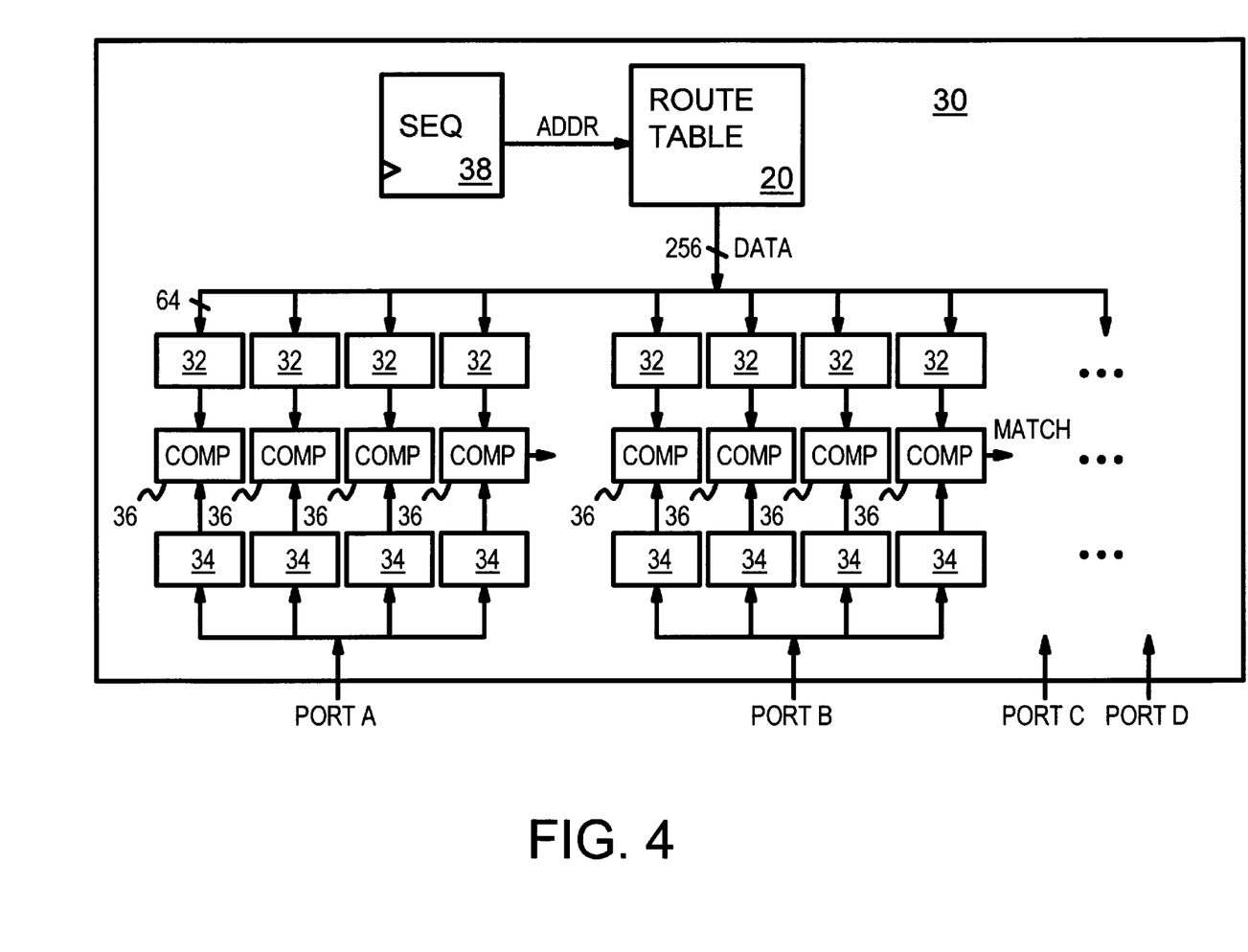
FIG. 4 shows a search chip with an embedded DRAM table for searching 4 entries and 4 ports in parallel.

Parallel-Entry & Port Search Chip—FIG. 4

FIG. 4 shows a search chip with an embedded DRAM table for searching 4 entries and 4 ports in parallel. The internal bus from the embedded-DRAM routing table 20 to entry registers 32 is increased to 256 bits. This allows four 64-bit entries to be read and transferred from routing table 20 during each memory access cycle.

For 8K table entries, sequencer 38 is modified to count to 2K, with each address outputting four table entries. An 11-bit counter can be used. Sequencer 38 moves ahead by four table entries for each clock pulse.

The four entries read from routing table 20 are loaded into the four entry registers 32 for port A, and the four entry registers 32 for each of the other three ports. The first entry is loaded into the right-most of the four registers, the second entry into the second of the four registers, the third entry to the third of each port's group of four registers, and the fourth entry of the 256-bit read from routing table 20 is loaded into the left-most of the four entry registers 32 for each port.

When a new incoming packet is detected, its destination addresses is loaded into each of the four port registers 34 for that port. Four comparators 36 compare this single destination address to four different entry addresses in entry registers 32. When one of the four comparators 36 detects a match, the search for that port ends. The port number from the entry register 32 for the comparator 36 detecting the match is sent to the network switch to establish the connection. A policy, such as not allowing data from an unauthorized source, may be applied by performing a similar search on the incoming source address.

Search latency is reduced by a factor of four, since four entries are compared for each memory-access cycle. Up to four different ports may be searched simultaneously.

Figure 5:
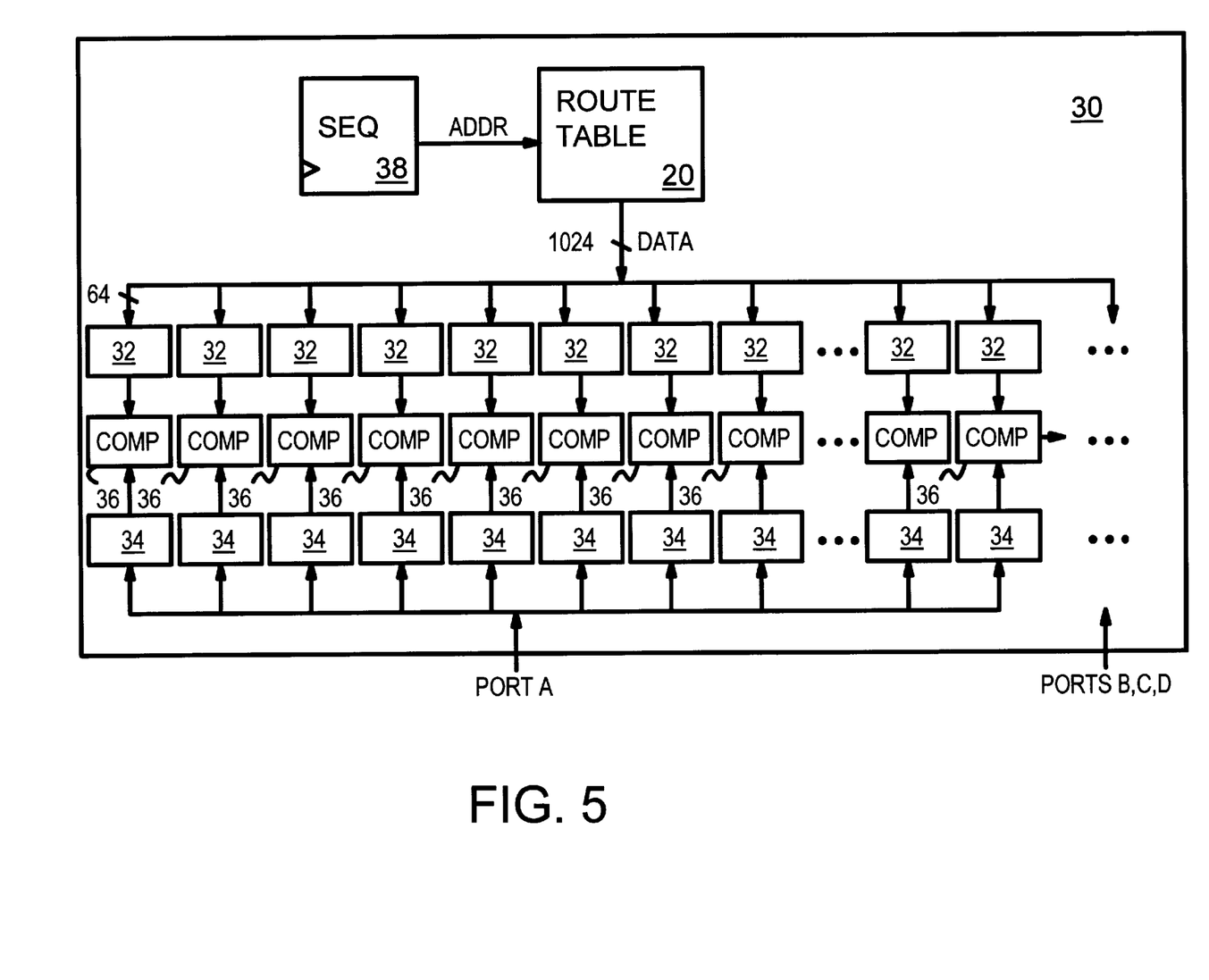
FIG. 5 shows a search chip with an internal 1024-bit bus connecting an embedded-DRAM routing table with a search array.

Ultra-Parallel Search Chip—FIG. 5

FIG. 5 shows a search chip with an internal 1024-bit bus connecting an embedded-DRAM routing table with a search array. The internal bus from routing table 20 is increased to 1024 bits, enough to simultaneously transfer 16 64-bit entries in a memory access cycle. Such a wide DRAM interface is not practical for external busses as the pin cost and IC package cost is high.

Sequencer 38 effectively increments by 16 table entries for each clock, so that successive addresses point to a next group of 16 table entries. The maximum latency is reduced to 0.5 K memory-access cycles for a table with 8K entries, since 16 entries are read for each cycle.

The sixteen different 64-bit entries are loaded into the sixteen entry registers 32 for a port. Since there are four search ports (A,B,C,D), each entry is loaded into four entry registers 32, one for each search port.

When a new search begins, the destination address from the incoming packet is loaded into all 16 port registers 34 for an unused search port. The 16 comparators 36 for that search port compare the single destination address to all 16 entries read from routing table 20 in a cycle. Alternately, a single port register could drive all 16 comparators 36 for a search port.

When a match is detected in any one of the 16 comparators 36 for a search port, the output-port number in the matching entry is sent to the network switch, along with the input-port number. The network switch establishes a connection between the input and output ports, allowing the packet to be sent along the next link toward its destination.

While a large number of comparators and registers (64) are required for four search ports, individual registers and compare cells (XOR gates) are small. For a 48-bit MAC address, 48 XOR gates are needed for each comparator 36, or a total of 3072 XOR gates. This is about 10K 2-input NAND equivalent gates.

Figure 6:
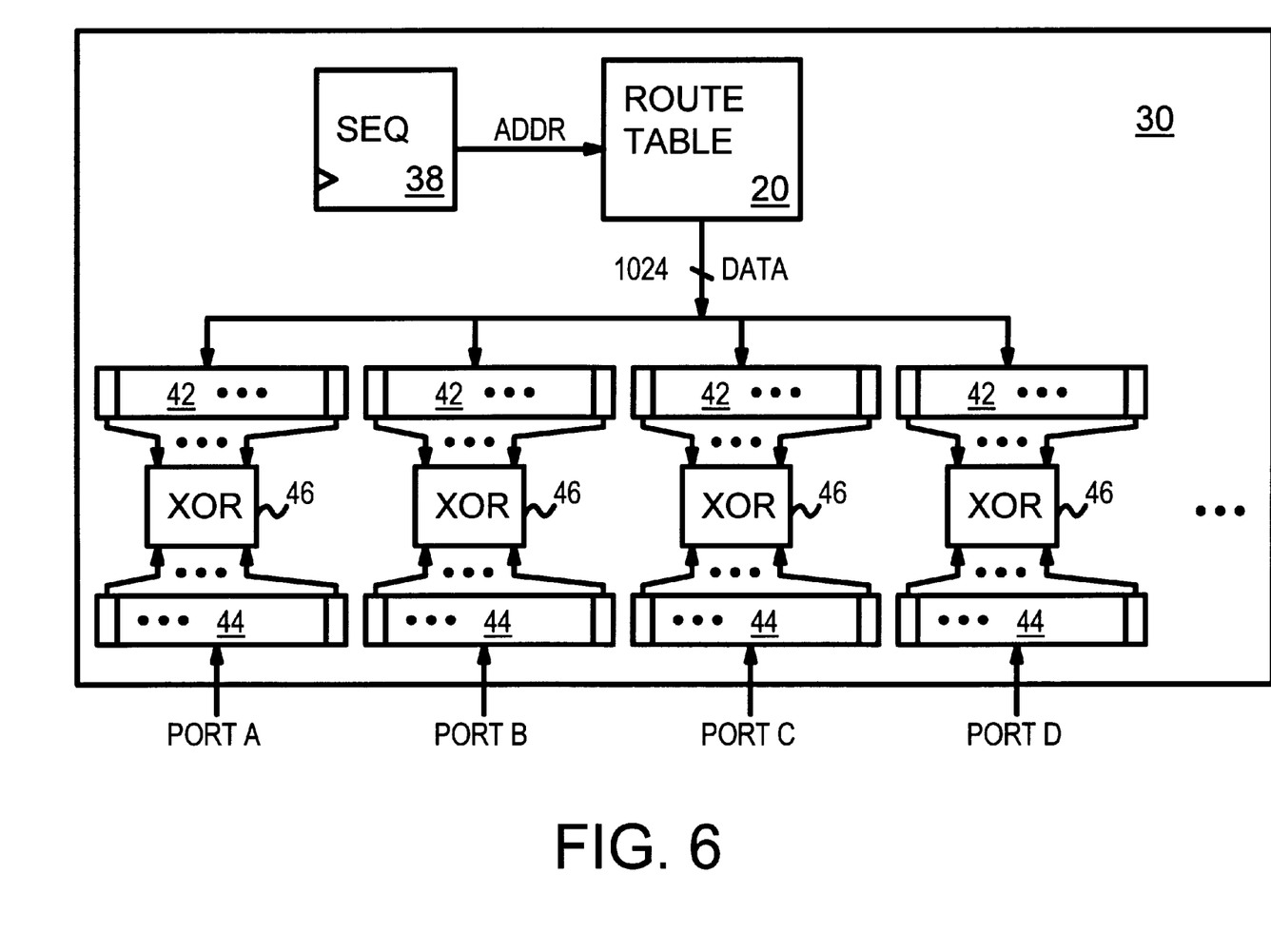
FIG. 6 illustrates a parallel search chip with a variable-width entry compare.

Variable-Width Search Chip—FIG. 6

FIG. 6 illustrates a parallel search chip with a variable-width entry compare. Sequencer 38 is programmable for the address terminal count, allowing the counter to be adjusted to match the number of entries in routing table 20 during each memory circulation.

Entry registers 42 are each loaded with the current group of entries read from routing table 20 for each clock cycle. Destination addresses for up to four input ports are loaded into port registers 44 at the beginning of a search. Exclusive-OR (XOR) blocks 46 compare address bits in entry registers 42 with address bits from port registers 44. When a match occurs, the search ends and the port number for the matching entry is sent to the network switch to establish the connection.

The lower-level MAC address is 48 bits, while the higher-level IP address is 64 bits, with 32 bits for source and 32 bits for destination. When MAC addresses are stored in routing table 20, only 48 bits are compared for each entry by XOR blocks 46. However, when IP addresses are stored in routing table 20, all 32 destination bits are compared for each entry by XOR blocks 46. All 48 bits in a MAC address must match for a MAC match, while all 32 bits in an entry must match for an IP match. Control logic in XOR blocks 46 disables or re-routes some XOR-gate outputs to summing logic as needed for MAC or IP address matching.

Each entry register 42 contains several entries, while the destination address is replicated in port register 44 or routed to the corresponding XOR gates in XOR block 46. The output-port number from the entry may be loaded into entry registers 42, or may not be latched from routing table 20 until a match is found. A separate set of 16 output-port registers may be connected to the 1024-bit internal bus from routing table 20 to act as pipeline registers to hold the output-port numbers. These registers can be read later if a match is detected. Control logic in the comparators allows matching of variable length entries such as 48-bit MAC address or 32-bit IP address.

Figure 7:
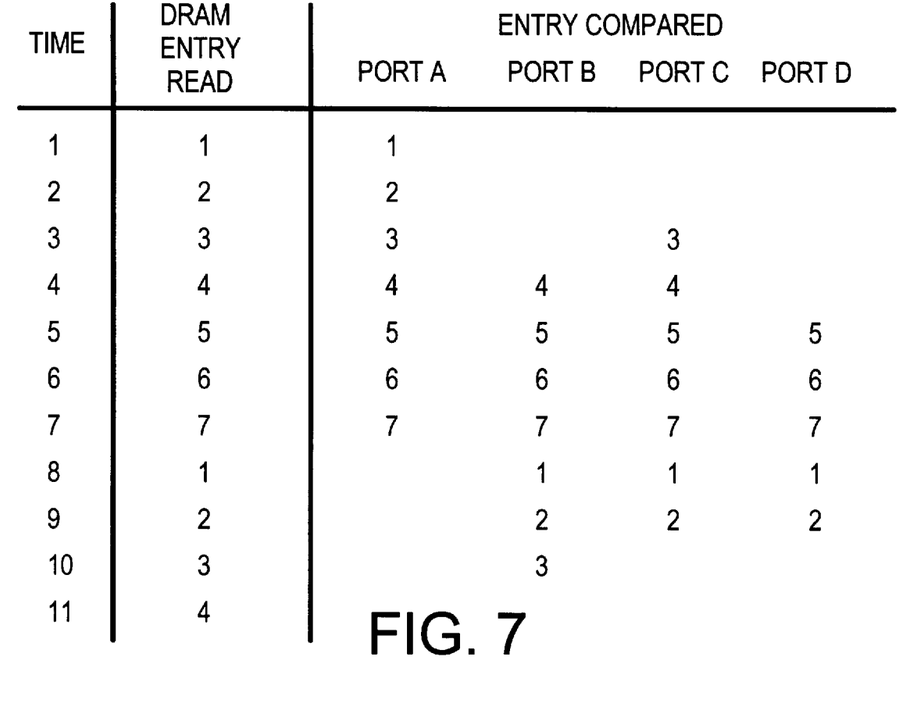
FIG. 7 highlights search timing, showing that searches can begin and end at any time.

Searches Start at Any Time—FIG. 7

FIG. 7 highlights search timing, showing that searches can begin and end at any time. Such a timing could be applied to the search chip of FIG. 3. During clock cycle or time slot 1, entry 1 is read from the routing table. Entries 2–7 are read during time slots 2–7. Since the table in this simplified example has only 7 entries, the sequencer wraps back to entry 1, which is read again during time slot 8. Entries 2–7 are read again during time slots 9–14.

A new packet is detected on one of the input ports and assigned to search port A before time slot 1. During time slot 1, entry 1 is read from the routing table and compared to destination address A. During time slot 2, entry 2 is read and compared to destination address A. This continues until a match is found. In the worst case, the match occurs during time slot 7 for entry 7.

Another new packet is detected and assigned to search port C during time slot 2. The first entry read and compared for port C is entry 3, since that is the entry read during time slot 3. Entries 4, 5, 6, 7 are read and compared to destination address C during times 4, 5, 6, 7. Then entries 1 and 2 are compared during times 8, 9. The worst case occurs when entry 2 matches the destination address for port C.

Incoming packets are detected during times 3 and 4 for two other input ports. These are assigned to search ports B and D. Searching for port B begins with entry 4 in time 4 and concludes with entry 3 at time 10, or until an earlier match is detected. Searching for port D begins with entry 5 in time 5 and in the worst-case concludes with entry 4 at time 11. However, an earlier match is found with entry 2 at time 9, so the port-D search ends early. On average, searches should take only half of the maximum search time if the entries are randomly mapped.

At any time, up to four destination addresses can be compared to the same entry address. For example, during time 6, entry 6 from the routing table is compared to destination addresses for ports A, B, C, D. During time 7, entry 7 is compared to destination addresses for all ports A, B, C, D.

Figure 8:
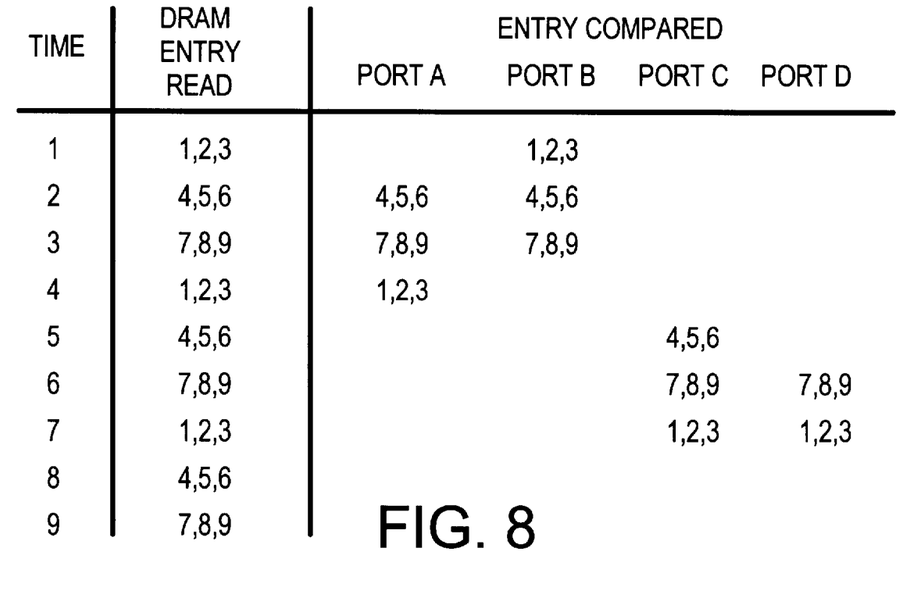
FIG. 8 highlights parallel-entry search timing, showing that searches can begin and end at any time.

Parallel Searches Start at Any Time—FIG. 8

FIG. 8 highlights parallel-entry search timing, showing that searches can begin and end at any time. Such a timing could be applied to a search chip such as for FIG. 4 but having only 3 comparators per port rather than 4.

During clock cycle or time 1, entries 1, 2, and 3 are read from the routing table. Entries 4, 5, 6 are read during time 2, while entries 7, 8, 9 are read during time 3. Since the table in this simplified example has only 9 entries, the sequencer wraps back to entry 1, which is read again during time 4. Entries 1–9 are read again during the next three cycle times 4–6.

Since 3 entries are read for each cycle time period, the entire 9-entry table is read in just 3 cycles. Latency is reduced from a maximum of 9 periods to just 3 periods.

A new packet is detected on one of the input ports and assigned to search port B before time 1. During time 1, entries 1, 2, 3 are read from the routing table and compared to destination address B. During time 2, entries 4, 5, 6 are read and compared to destination address B. This continues with entries 6, 7, 8 in time 3 unless a match is found. In the worst case, the match occurs during time 3 for entry 7, 8, or 9.

Another new packet is detected and assigned to search port A during time 1. The first group of entries read and compared for port A is entries 4, 5, 6, since those are the entries read during time 2. Entries 7, 8, 9 are read and compared to destination address A during time 3. Then entries 1, 2, 3 are compared during time 4. The worst case occurs when entry 1, 2, or 3 matches the destination address for port A.

Incoming packets are detected during times 4 and 5 for two other input ports. These are assigned to search ports C and D. Searching for port C begins with entries 4, 5, 6 in time 5 and concludes with entries 1, 2, 3 at time 7, or until an earlier match is detected. Searching for port D begins with entries 7, 8, 9 in time 6 and in the worst-case concludes with entries 4, 5, 6 at time 8. However, an earlier match is found with entry 2 at time 7, so the port-D search ends early.

At any time, up to four destination addresses can be compared to the same 3 entry addresses. For example, during time 6, entries 7, 8, 9 from the routing table are compared to destination addresses for ports C, D.

Figure 9:
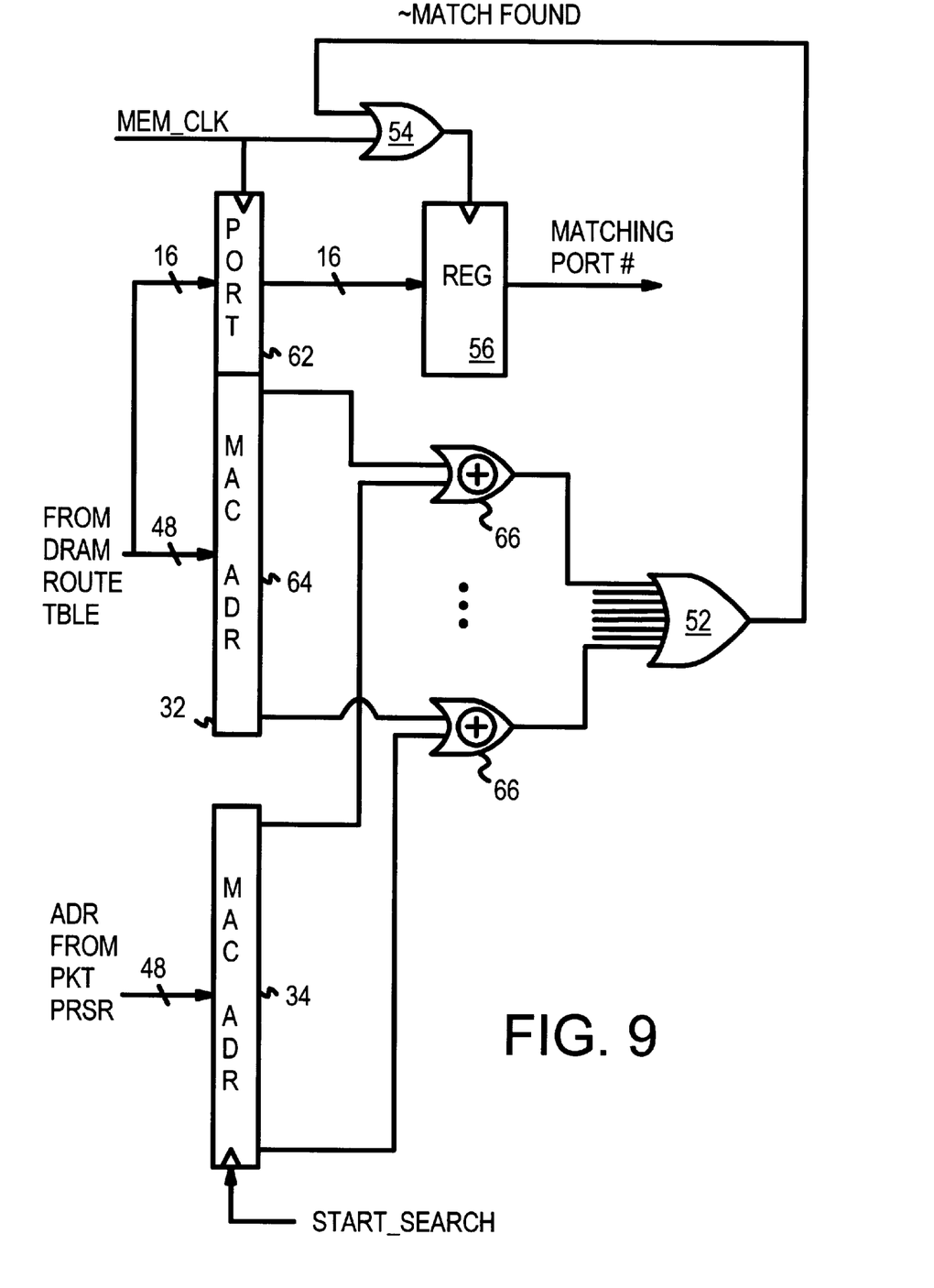
FIG. 9 is a diagram of a comparator for a 48-bit MAC address.

MAC-Address Comparator—FIG. 9

FIG. 9 is a diagram of a comparator for a 48-bit MAC address. One such comparator is needed for each entry and each search port compared in parallel and thus corresponds to comparators 36 in FIGS. 3, 4, 5.

Each 64-bit routing-table entry has a 48-bit MAC address and a 16-bit output. A new entry is loaded into entry register 32 for each MEM_CLK cycle. The 48-bit MAC address is loaded into sub-register 64, while the 16-bit output is loaded into sub-register 62.

When a new incoming packet is detected, its destination MAC address is loaded into port register 34 by START_SEARCH, which is activated only at the start of a new search, not every memory-clock cycle. XOR gates 66 compare each of the 48 address bits from sub-register 64 to port register 34. This search is repeated each cycle of MEM_CLK. Signal START_SEARCH is synchronized to MEM_CLK to avoid glitches.

When all 48 address bits match, all 48 XOR gates 66 output a low to OR gate 52. OR gate 52 then outputs a low to OR gate 54, signaling a match. OR gate 54 sends a pulse to output register 56 on the next MEM_CLK low, causing the 16-bit port number from sub-register 62 to be latched into output register 56. The port number can then be sent to the network switch.

The 16-bit output may include policy bits and other bits besides a port identifier. These policy bits can be used by hardware to determine a priority for the connection. A route may be selected from among various possibilities using such policy bits or packets may be blocked or unblocked. The actual port identifier may be only 4 bits, depending on the number of ports supported.

Figure 10:
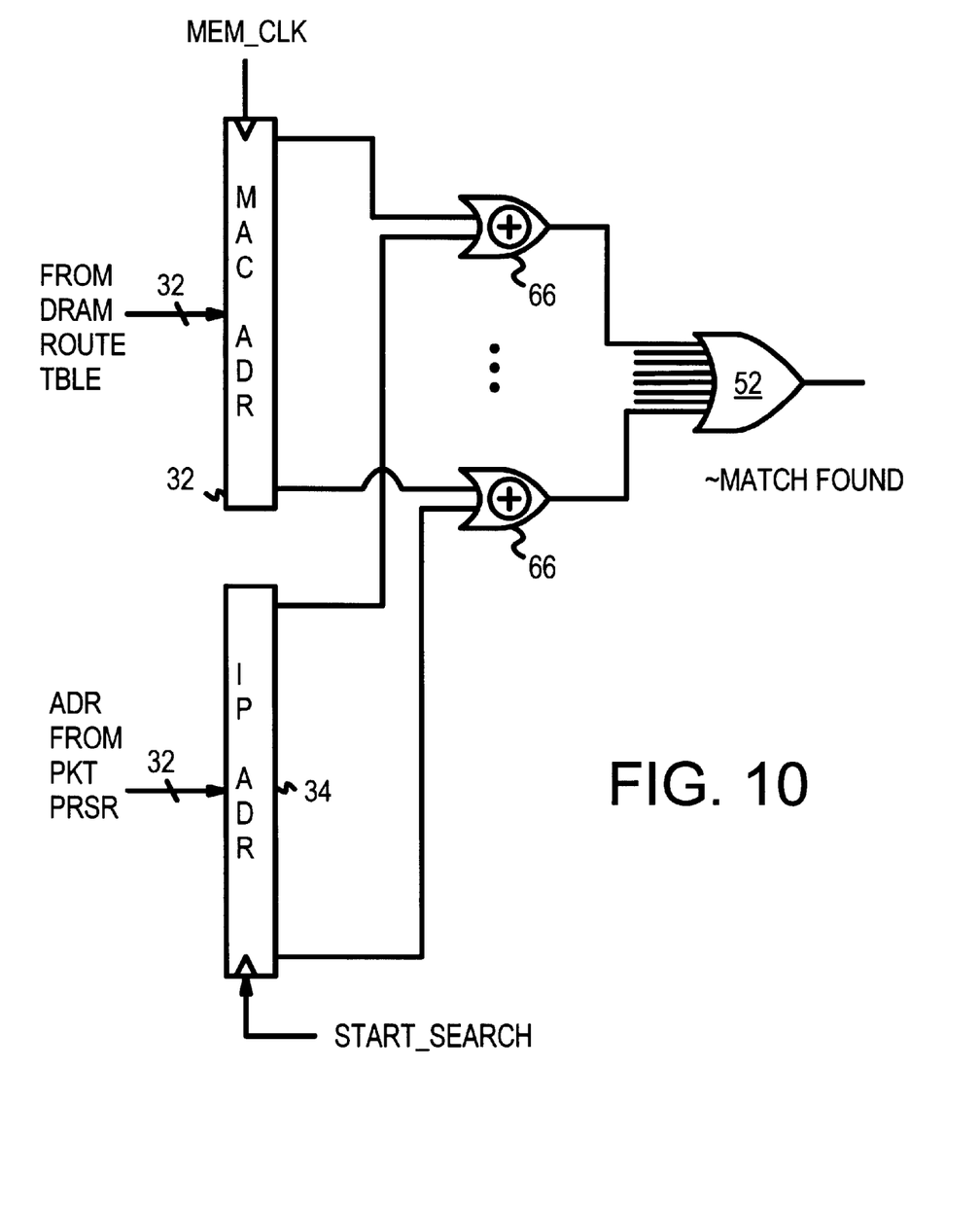
FIG. 10 is a diagram of a comparator for a 32-bit address.

IP-Address Comparator—FIG. 10

FIG. 10 is a diagram of a comparator for a 32-bit IP address. One such comparator is needed for each entry and each search port compared in parallel and thus corresponds to comparators 36 in FIGS. 3, 4, 5.

Each 32-bit routing-table entry has a single 32-bit IP address. A new entry is loaded into entry register 32 for each MEM_CLK cycle. The 32-bit destination IP address is loaded into all of register 32.

When a new incoming packet is detected, its 32-bit destination IP address is loaded into port register 34 by START_SEARCH, which is activated only at the start of a new search, not every memory-clock cycle. XOR gates 66 compare each of the 32 address bits from register 32 to port register 34. This search is repeated each cycle of MEM_CLK.

When all 32 address bits match, all 32 XOR gates 66 output a low to OR gate 52. OR gate 52 then signals a match. The port number can then be sent to the network switch.

Control logic that converts the 48-bit matching logic of FIG. 9 to 32-bit matching logic as shown in FIG. 10 can be implemented with widely-available logic synthesis tools rather than explicitly adding muxes and control gates. Thus a variable-width comparator can be implemented with these design tools.

Figure 11:
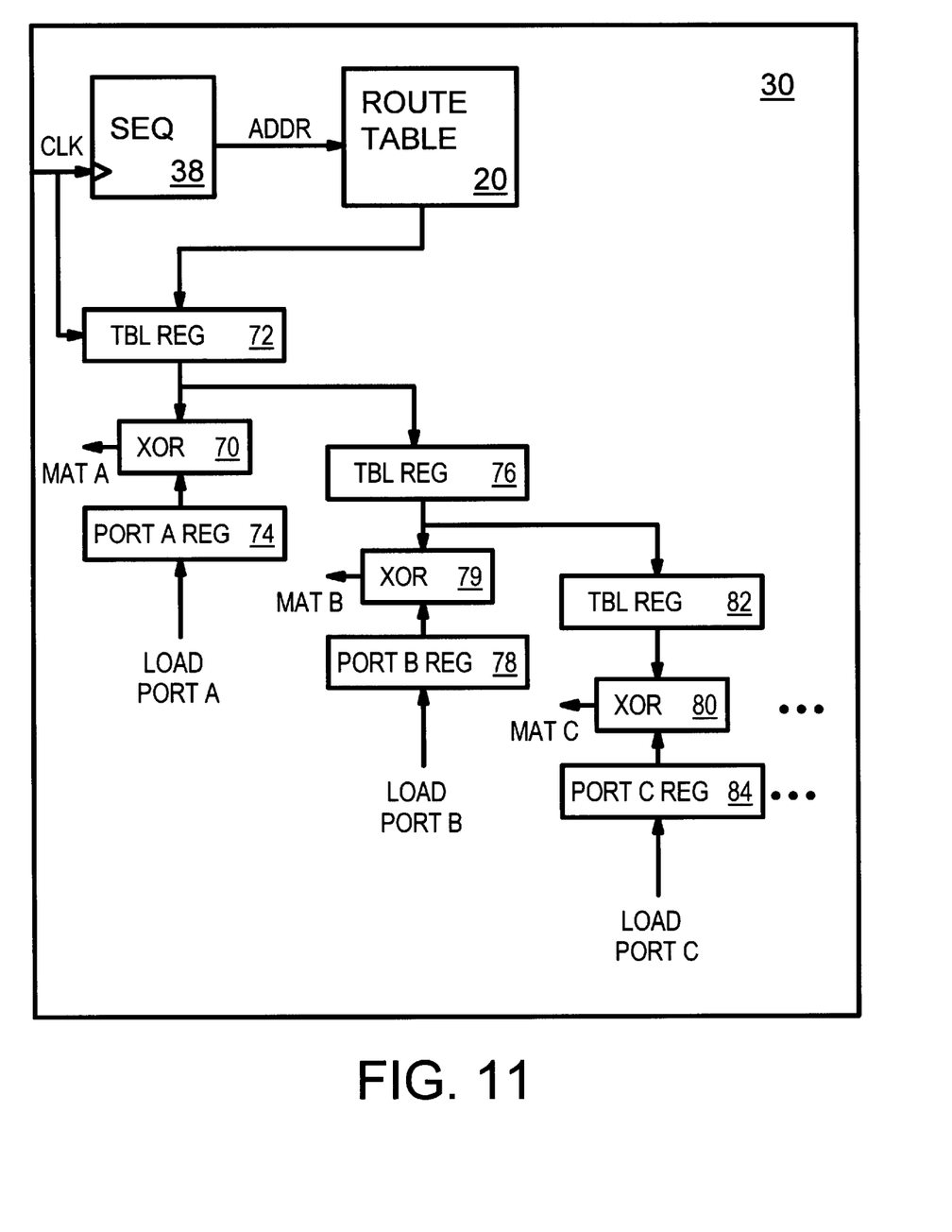
FIG. 11 highlights a search engine with an embedded-DRAM routing table that cascades entry registers to reduce loading on the DRAM bus.

Cascaded Search Engine—FIG. 11

FIG. 11 highlights a search engine with an embedded-DRAM routing table that cascades entry registers to reduce loading on the DRAM bus. The search engines for the search ports may be cascaded so that entries from routing table 20 are passed from one search engine to the next rather than sent to all search engines at the same time.

Sequencer 38 generates a series of addresses to access entries in routing table 20. Each entry read from routing table 20 is sent to first entry register 72. When multiple entries are read from routing table 20 for each clock cycle, first entry register 72 contains all the entries read in parallel. Comparator 70 compares the addresses from the entries in first entry register 72 to the destination address in port register 74 and outputs a match signal when one of the entries matches the destination address. The search for port A then ends and a new search for another incoming packet can be performed using port A.

As the address from the entries in first entry register 72 is being compared by comparator 70, the entries are also passed to second entry register 76 in the second search engine for search port B. During the following clock cycle, comparator 79 compares the second destination address in port B register 78 with the entry in second entry register 76. When a match occurs, port B finishes.

Likewise, as the address from the entries in second entry register 76 is being compared by comparator 79, the entries are also passed to third entry register 82 in the third search engine for search port C. During the following clock cycle, comparator 80 compares the third destination address in port C register 84 with the entry in third entry register 82. When a match occurs, port C finishes.

Each entry or group of entries read from routing table 20 during a first memory-clock cycle are first loaded into first entry register 72, then loaded from first entry register to second entry register 76 during the second clock cycle, and finally transferred from second entry register 76 to third entry register 82 in the third clock cycle, and so on. Thus the compare for comparator 79 is always one entry behind the compare by comparator 70. The compare for comparator 82 is always two entries behind the compare by comparator 70.

Such pipelining of entries reduces the loading of the internal bus from routing table 20, since only one register is loaded. Other registers are loaded in later clock cycles from the other entry registers. Other search ports may be cascaded on to third entry register 82, allowing more than 3 ports to be searched in parallel.

The maximum search time is not increased, since sequencer 38 is free-running and the location of the starting entry is merely changed by the register pipelining. The maximum search time is always the memory-access-cycle multiplied by the number of entries in routing table 20, then divided by the number of entries fetched together from routing table 20.

Advantages of the Invention

A search engine for a network switch reads a routing table for an entry with a matching MAC or IP address. An embedded DRAM contains the routing table. The search engine and the embedded DRAM are integrated together on the same integrated circuit chip, allowing a very wide data path between the search engine and the routing table. The speed of the search engine is increased by using an ultra-wide data path to the routing table. A parallel architecture for the search engine allows searches for different input ports to occur at the same time, increasing throughput and decreasing latency. A same low latency for all input ports is provided, even when other searches are in progress. A highly-parallel multiple-port search engine is achieved.

For a 4-entry parallel search engine, a 300-pin chip is needed to achieve the same throughput if an embedded DRAM was not used. In another example, a 1024-bit internal bus allows 16 entries of the routing table to be sent to the comparator for each memory access cycle. Such a transfer rate would require at a minimum a 1200-pin chip, or multiple chips, making the cost prohibitive. Thus putting the routing table in an embedded DRAM allows 4 to 16 entries to be searched in parallel by the search chip. Pin-count and power consumption are reduced by integrating the DRAM with the search engine.

The architecture is scalable such that size of the table, the bus width, the degree of parallelism of the hardware, and the clock speed can be adjusted to meet the requirement of the application. Additionally, this facilitates further integration of the network switch, including physical drivers and the media-access controller (MAC) on the same chip. For example, the bus width can be higher than 1024 and the memory depth can be greater than 8K, depending on the technology used to implement the chip. With the free running sequencer, the maximum search time is predictable regardless of the number of ports and the amount of data passing through the device. The invention allows easy updating of the table, because the entries can be randomly located. An address can be loaded in the table at any available location. Higher clock rates and wide buses enable larger table searches for gigabit data rates at wire speed.

Multiple entries made possible by the wide data bus can also be used to match the source and destination address for both MAC and IP address at the same time, provided the data structure in the table is created to make this possible.

Alternate Embodiments

Several other embodiments are contemplated by the inventor. For example dynamic registers or latches may be used for entry registers. FIFO buffers or pipeline latches can be inserted into the circuitry at many points, such as to and from the embedded memory. Multiple tables or banks of embedded DRAM with different contents can be used to simultaneously perform different types of searches with the invention. The embedded DRAM is integrated on a same silicon substrate with the parallel search engines. Other kinds of substrates may be substituted.

Arithmetic comparators may replace the logical comparators for implementing filters in the network hardware. The invention can also be used for searching strings of alphanumeric characters received on multiple ports. More than one register may be loaded during first clock cycle depending on the drive capability of the table.

Incoming packets on input ports can be dynamically assigned to an available search ports, or input ports can statically share a search port with other input ports. Comparators can be constructed in many ways, using inverting logic such as XNOR gates rather than XOR gates. Depending on the application and the number of ports required, the network switch and the search engine may be integrated on the same semiconductor chip along with MAC and Physical interface drivers.

In order to further enhance the search process and provide some priority scheme, the sequencer may be loaded with a terminal count where there is maximum likelihood of finding a match. The decision to load the terminal count is made elsewhere. Additionally, the routing table shall then be organized with such a data structure.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. A parallel-search integrated circuit comprising:
   a free-running sequencer for repeatedly outputting a sequence of addresses in a loop;
   a table for storing a plurality of entries, the table outputting an entry in response to an address from the free-running sequencer;
   a plurality of search engines, each search engine receiving the entry from the table, the plurality of search engines including:
      a first search engine for comparing at least a portion of the entry to a first input and generating a first match signal when the first input matches the at least a portion of the entry;
      a second search engine for comparing the at least a portion of the entry to a second input and generating a second match signal when the second input matches the at least a portion of the entry;
      a third search engine for comparing the at least a portion of the entry to a third input and generating a third match signal when the third input matches the at least a portion of the entry;
   wherein the free-running sequencer repeats the sequence of addresses once all entries have been read from the table;
   wherein the first search engine begins a search once the first input is received, the first search engine beginning the search at any address in the sequence of addresses and continuing until all entries have been compared by the first search engine or until the first match signal is generated;
   wherein the second search engine begins a search once the second input is received, the second search engine beginning the search at any address in the sequence of addresses and continuing until all entries have been compared by the second search engine or until the second match signal is generated;
   wherein the third search engine begins a search once the third input is received, the third search engine beginning the search at any address in the sequence of addresses and continuing until all entries have been compared by the third search engine or until the third match signal is generated; and
   wherein the first, second, and third search engines perform overlapping searches that begin and end at different times and at different addresses in the sequence, whereby parallel searches are performed.

2. The parallel-search integrated circuit of claim 1 wherein the table is contained in an embedded dynamic-random-access memory (DRAM) integrated on a same silicon chip as the free-running sequencer and plurality of search engines,
   whereby the table is in the embedded DRAM.

3. The parallel-search integrated circuit of claim 2 further comprising:
   an internal bus, coupled between the table and the plurality of search engines, the internal bus for transferring the entry from the table to the plurality of search engines.

4. The parallel-search integrated circuit of claim 3 wherein the internal bus is a wide bus having a width sufficient to transfer a group of multiple entries to each search engine in the plurality of search engines for each memory access cycle of the embedded DRAM, wherein first search engine is for comparing at least a portion of each of the multiple entries to the first input and generating a first match signal when the first input matches the at least a portion of any of the multiple entries;

wherein second search engine is for comparing at least a portion of each of the multiple entries to the second input and generating a second match signal when the second input matches the at least a portion of any of the multiple entries;

wherein third search engine is for comparing at least a portion of each of the multiple entries to the third input and generating a third match signal when the third input matches the at least a portion of any of the multiple entries;

whereby multiple entries are compared for each memory access cycle from the embedded DRAM.

5. The parallel-search integrated circuit of claim 4 wherein the internal bus comprises at least 256 data bits.

6. The parallel-search integrated circuit of claim 4 wherein the internal bus comprises at least 1024 data bits.

7. The parallel-search integrated circuit of claim 2 wherein the table is a network routing table, wherein each entry contains a network address, the network address being compared by the first search engine to a first destination address applied to the first input, the network address being compared by the second search engine to a second destination address applied to the second input, the network address being compared by the third search engine to a third destination address applied to the third input, wherein the network routing table is searched for an entry that matches a destination address.

8. The parallel-search integrated circuit of claim 7 wherein the first destination address is extracted from a destination-address field of a network packet received at a first input port of a network switch;

wherein the second destination address is extracted from a destination-address field of a network packet received at a second input port of a network switch;

wherein the third destination address is extracted from a destination-address field of a network packet received at a third input port of a network switch, whereby destination addresses are extracted from incoming packets to a network switch.

9. The parallel-search integrated circuit of claim 8 wherein the destination address is a media-access-controller (MAC) addresses or an Internet Protocol (IP) address.

10. The parallel-search integrated circuit of claim 8 wherein each entry further comprises a port identifier, the port identifier indicating which of a plurality of output ports of the network switch should be connected to an input port of the network switch that received a network packet having a destination address that matches the network address from the entry.

11. A switch-based network router comprising:

a network switch, having a plurality of input ports for receiving network packets from different network nodes, for making temporary connections to output ports coupled to other network nodes;

the network switch making a first temporary connection in response to a first port identifier that identifies one of the output ports to connect to a first input port receiving a first packet;

the network switch making a second temporary connection in response to a second port identifier that identifies one of the output ports to connect to a second input port receiving a second packet;

a parallel search chip, coupled to the network switch, for receiving a first destination address from the first packet, the parallel search chip outputting the first port identifier to the network switch, the first port identifier being read from a first matching entry having an address field that matches the first destination address;

the parallel search chip also for receiving a second destination address from the second packet, for outputting the second port identifier to the network switch, the second port identifier being read from a second matching entry having an address field that matches the second destination address;

the parallel search chip further comprising:

sequencer means for generating addresses of entries, the addresses being in a fixed sequence that repeats once all entries are addressed;

routing table means, coupled to the sequencer means, for storing a plurality of entries, each entry containing a network address and a port identifier of an output port of the network switch that is connected to a network node that receives packets for that network address;

internal bus means, receiving an entry from the routing table means selected by the address from the sequencer means, for transferring the entry;

first search means, coupled to receive the entry from the internal bus means, for comparing the network address from the entry to the first destination address, and for outputting the port identifier from the entry as the first port identifier when a match occurs;

second search means, coupled to receive the entry from the internal bus means, for comparing the network address from the entry to the second destination address, and for outputting the port identifier from the entry as the second port identifier when a match occurs;

wherein the first and second search means receive a same entry from the routing table means but begin and end searches at different times, whereby parallel searches are performed using same entries read from the routing table means.

12. The switch-based network router of claim 11 wherein the internal bus means transfers two entries read from the routing table means in a single memory-access cycle, wherein the first search means further comprises:

additional-entry search means, receiving a second entry from the internal bus means, for comparing the network address from the second entry to the first destination address, and for outputting the port identifier from the entry as the first port identifier when a match occurs;

wherein the second search means further comprises:

additional-entry search means, receiving the second entry from the internal bus means, for comparing the network address from the second entry to the second destination address, and for outputting the port identifier from the entry as the second port identifier when a match occurs;

whereby multiple entries are read from the routing table means and compared.

13. The switch-based network router of claim 12 wherein the sequencer means increments by multiple entries.

14. The switch-based network router of claim 12 further comprising:
a central processing unit, coupled to the network switch, for executing a control program for initializing the network switch and the routing table means,
a main memory, coupled to the central processing unit, for storing the control program.

15. The switch-based network router of claim 12 wherein the network switch makes the second temporary connection while the first temporary connection is transmitting the first packet to an output port identified by the first port identifier,
whereby simultaneous temporary connections are made by the network switch.

16. The switch-based network router of claim 12 wherein the routing table means is an embedded dynamic-random-access memory (DRAM) contained within the parallel search chip on a same semiconductor substrate.

17. A parallel-search method for searching a network table, comprising:
generating a continuous-loop sequence of addresses;
reading a current entry from a routing table using an address in the sequence of addresses;
receiving a first packet at a first input port from a first network node;
parsing the first packet to extract a first destination address for the first packet;
in a first search engine, comparing the first destination address to a current network address in the current entry;
reading other entries from the routing table as the current entry and comparing in the first search engine to the first destination address when no match has yet been found;
outputting a first port identifier when the first search engine detects a match between the first destination address and the current network address;
receiving a second packet at a second input port from a second network node at a different time than the first packet is received;
parsing the second packet to extract a second destination address for the second packet;
in a second search engine, comparing the second destination address to a current network address in the current entry at the same time that the first search engine is comparing the first destination address to the current network address;
the second search engine comparing to the second destination address the other entries from the routing table as the current entry when no match has yet been found;
outputting a second port identifier when the second search engine detects a match between the second destination address and the current network address;
receiving a third packet at a third input port from a third network node;
parsing the third packet to extract a third destination address for the third packet;
in a third search engine, comparing the third destination address to a current network address in the current entry at the same time that the first search engine is comparing the first destination address to the current network address;
the third search engine comparing to the third destination address the other entries from the routing table as the current entry when no match has yet been found; and
outputting a third port identifier when the third search engine detects a match between the third destination address and the current network address;
whereby a same sequence of entries are read from the routing table and compared by different search engines that begin and end searches at different times.

18. The parallel-search method of claim 17 wherein a same maximum latency until a match is found is obtained for the first, second, and third packets.

19. The parallel-search method of claim 17 further comprising:
ending a search by the first search engine when a match is detected and allowing another search for another input port to use the first search engine;
ending a search by the second search engine when a match is detected and allowing another search for another input port to use the second search engine;
ending a search by the third search engine when a match is detected and allowing another search for another input port to use the third search engine.

20. The parallel-search method of claim 19 further comprising:
configuring a network switch to transfer the first packet from the first input port to a first output port identified by the first port identifier;
configuring a network switch to transfer the second packet from the second input port to a second output port identified by the second port identifier;
configuring a network switch to transfer the third packet from the third input port to a third output port identified by the third port identifier.

* * * * *